United States Patent [19]
Schickert et al.

[11] Patent Number: 5,881,537
[45] Date of Patent: Mar. 16, 1999

[54] METHOD OF PACKING A BASKETBALL GOAL SUPPORT SYSTEM

[75] Inventors: Randy R. Schickert, Kewaskum; Ronald A. White, N. Prairie; Mark E. Davis, Wauwatosa, all of Wis.

[73] Assignee: Huffy Corporation, Miamisburg, Ohio

[21] Appl. No.: 81,946

[22] Filed: May 21, 1998

Related U.S. Application Data

[60] Division of Ser. No. 593,322, Jan. 31, 1996, which is a continuation-in-part of Ser. No. 190,914, Feb. 3, 1994, Pat. No. 5,626,339, and Ser. No. 337,884, Nov. 14, 1994, Pat. No. 5,632,480.

[51] Int. Cl.⁶ .......................................................... B65B 5/08
[52] U.S. Cl. ................................................ 53/445; 53/474
[58] Field of Search ..................... 53/445, 474; 206/579, 206/315.1, 315.9

[56] References Cited

U.S. PATENT DOCUMENTS

| | | |
|---|---|---|
| Re. 25,938 | 12/1965 | Mobley . |
| D. 264,740 | 6/1982 | Merino et al. . |
| 1,043,387 | 11/1912 | Astruck . |
| 1,270,004 | 6/1918 | Chappell . |
| 1,570,403 | 1/1926 | Ripczinske . |
| 1,631,227 | 6/1927 | See . |
| 1,988,037 | 1/1935 | Furrer . |
| 2,457,908 | 1/1949 | Meyerhoefer . |
| 2,483,734 | 10/1949 | Neal . |
| 2,586,724 | 2/1952 | Sanneback . |
| 2,818,254 | 12/1957 | Dunn . |
| 2,916,184 | 12/1959 | Hartley et al. . |
| 2,986,395 | 5/1961 | Sheftel . |
| 3,137,502 | 6/1964 | Duganich . |
| 3,341,197 | 9/1967 | Bottorff . |
| 3,401,774 | 9/1968 | Krahn . |
| 3,669,450 | 6/1972 | Mason . |
| 3,716,234 | 2/1973 | Lancellotti . |
| 3,722,903 | 3/1973 | Jones . |
| 3,841,631 | 10/1974 | Dolan . |
| 3,900,194 | 8/1975 | Ward . |
| 3,908,992 | 9/1975 | Cunningham et al. . |
| 3,964,743 | 6/1976 | Salsich, Sr. . |

(List continued on next page.)

FOREIGN PATENT DOCUMENTS

| | | |
|---|---|---|
| 605246 | 5/1926 | France . |
| 2234942 | 2/1973 | Germany . |
| 2920903 | 12/1980 | Germany . |
| 19177 | 8/1914 | United Kingdom . |
| 908055 | 10/1962 | United Kingdom . |
| WO 95/26823 | 10/1995 | WIPO . |

OTHER PUBLICATIONS

Huffy Youth Sports styrene basketball board (admitted prior art).
SureShot polystrene, structurally foamed basketball backboard (admitted prior art).
Huffy Sports Product Brochure, "Center Court Portables" (9H421—Tuff Stuff; 9H331—Zero Gravity; 9H366—Zero Gravity; 9H335—Get Vertical) (admitted prior art).
Sportime catalog, 1993 Summer Edition, p. 135, Cast Aluminum Fan–Shaped Backboard (Sep. 1993).

*Primary Examiner*—Daniel B. Moon
*Attorney, Agent, or Firm*—Howrey & Simon; Michael J. Bell; Andrew R. Kopsidas

[57] ABSTRACT

A method of packing a portable basketball goal support system having a base, a ballast tank, and an arm for supporting a basketball goal support pole which can be assembled in an expanded configuration for use and a compact configuration for shipping or storage. In the expanded configuration, the ballast tank extends at least partially behind the support pole providing stability for the base, while in the compact configuration, the ballast tank may be nested within a portion of the base, thereby occupying less space. The overall length, height, and thickness of the support assembly are thus reduced for storage, thus occupying less space when shipped or stored than would be possible in previous conventional designs providing comparable performance.

5 Claims, 15 Drawing Sheets

U.S. PATENT DOCUMENTS

| | | |
|---|---|---|
| 3,970,240 | 7/1976 | Van Leer . |
| 4,095,825 | 6/1978 | Butler . |
| 4,145,044 | 3/1979 | Wilson et al. . |
| 4,286,409 | 9/1981 | Taylor et al. . |
| 4,402,262 | 9/1983 | Handforth . |
| 4,412,679 | 11/1983 | Mahoney et al. . |
| 4,424,968 | 1/1984 | Smith . |
| 4,478,415 | 10/1984 | Shaffer et al. . |
| 4,583,732 | 4/1986 | Allen . |
| 4,613,136 | 9/1986 | Raba et al. . |
| 4,640,211 | 2/1987 | Namur . |
| 4,731,279 | 3/1988 | Isshiki . |
| 4,757,778 | 7/1988 | Scaglia . |
| 4,759,545 | 7/1988 | Grable . |
| 4,786,053 | 11/1988 | Barnes, Jr. . |
| 4,793,611 | 12/1988 | Thornell . |
| 4,826,162 | 5/1989 | Allen . |
| 4,869,501 | 9/1989 | Anastasakis . |
| 4,913,388 | 4/1990 | McCant . |
| 4,931,248 | 6/1990 | Willemin . |
| 5,066,007 | 11/1991 | Niver . |
| 5,082,261 | 1/1992 | Pelfrey . |
| 5,098,092 | 3/1992 | Aakre et al. . |
| 5,112,023 | 5/1992 | Sowers . |
| 5,145,153 | 9/1992 | Glynn . |
| 5,158,281 | 10/1992 | Williams . |
| 5,163,676 | 11/1992 | Taub . |
| 5,207,407 | 5/1993 | Fitzsimmons et al. . |
| 5,224,699 | 7/1993 | Zaruba . |
| 5,248,140 | 9/1993 | Matherne et al. . |
| 5,259,612 | 11/1993 | Matherne et al. . |
| 5,292,118 | 3/1994 | Allen et al. . |
| 5,354,049 | 10/1994 | Matherne et al. . |
| 5,375,835 | 12/1994 | Van Nimwegen et al. . |
| 5,377,976 | 1/1995 | Matherne et al. . |
| 5,415,393 | 5/1995 | Fitzsimmons et al. . |
| 5,433,432 | 7/1995 | Adler . |
| 5,470,054 | 11/1995 | Bohrman . |
| 5,507,484 | 4/1996 | Van Nimwegen et al. . |
| 5,556,088 | 9/1996 | Mower et al. . |

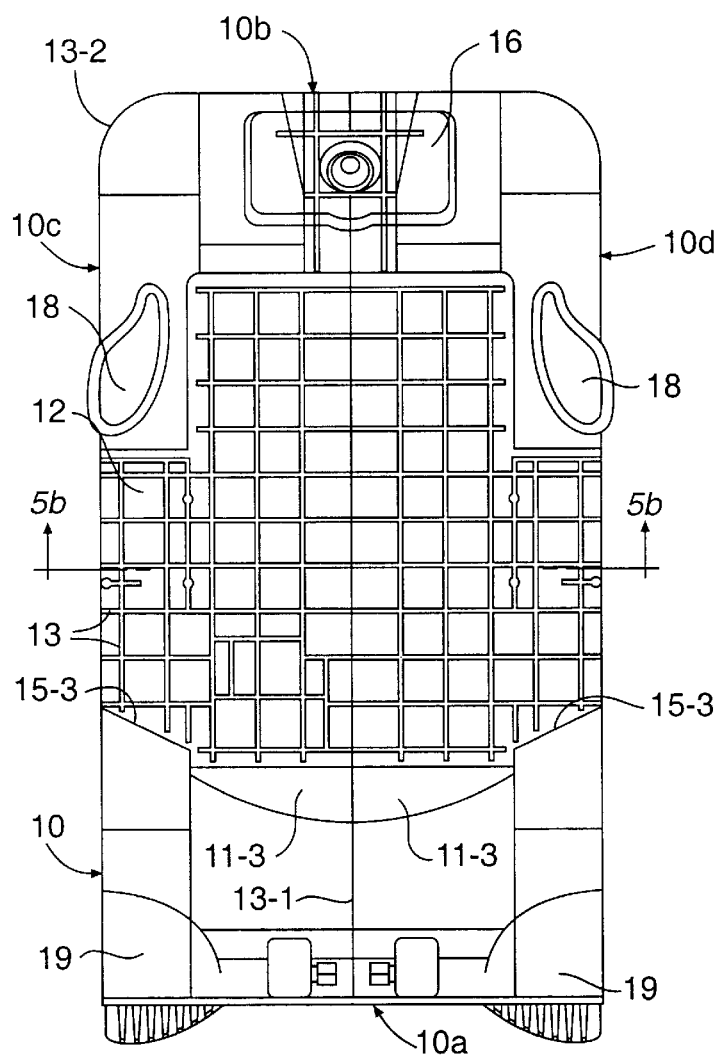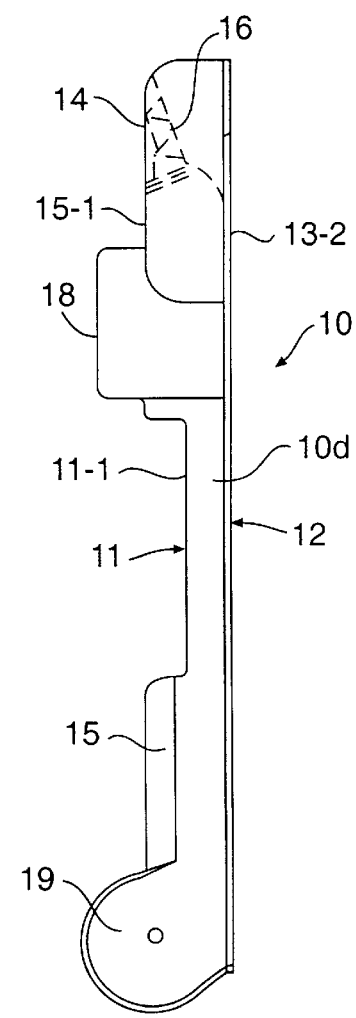
*FIG. 4*      *FIG. 5(a)*

METHOD OF PACKING A BASKETBALL GOAL SUPPORT SYSTEM

This application is a divisional application of application Ser. No. 08/593,322 filed on Jan. 31, 1996 which is a continuation-in-part of application Ser. No. 08/190,914, filed Feb. 3, 1994 and issued on May 6, 1997 as U.S. Pat. No. 5,626,339, and of application Ser. No. 08/337,884, filed Nov. 14, 1994 and issued on May 27, 1997 as U.S. Pat. No. 5,632,480, the disclosures of both are incorporated herein by reference.

BACKGROUND OF THE INVENTION

1. Field of the Invention

The invention relates generally to a method of packing portable basketball goal support systems and, in particular, to a basketball goal support system having a base and a separate ballast tank that cooperates with the base to form a compact position for shipping/storage, and an expanded position having an increased support system footprint that places the ballast towards the rear of the system to provide greater support and stability during play, as well as to an improved support pole.

2. Description of Related Art

Various types of basketball goal support assemblies have been proposed and used in the past. Such proposals have recognized that stability, and in some instances portability, are desirable characteristics. However, stability and portability can present conflicting design considerations and make it difficult to provide collapsibility, which is especially desirable for shipping and storage of portable basketball support assemblies. In the past, providing both stability and portability in a particular construction has come at the price of requiring a more complex structural arrangement and a larger base, which meant added complexity in both assembly and use as well as increased costs in storage space and shipping. These problems may be present to some degree in smaller applications like poolside and youth sports products. See, for example: 1) the poolside system disclosed in U.S. Pat. No. 4,759,545 to Grable, wherein a base is adapted to seat on a pool deck and receive a first quantity of water internally and an additional quantity of water or other material externally when additional ballast is needed; and 2) the youth sports products described in parent U.S. Pat. No. 5,632,480 in which a separate ballast tank is mounted on top of a base in a single configuration. However, overcoming the conflicting design considerations of stability and portability is a more difficult task in designing larger units for adults and regulation play, which must be able to withstand heavier loads and more aggressive conditions. Moreover, the recent trend towards using larger and larger backboards in portable systems designed for regulation play has exacerbated these problems.

Conventionally, portable basketball systems of this type have included several main components: a basketball backboard supporting a basketball goal and a net; a pole and extension arm, elevator, or other mechanism for supporting the backboard on the pole; and a base for supporting the pole. Typically, ballast material such as water or sand is provided on top of or inside the base section to weigh down the unit, and provide the requisite stability during use. An example of a support system in which weights are provided on top of a base is disclosed in U.S. Pat. No. 4,869,501 to Anastasakis. An example of a portable system having ballast inside a base is described in the assignee's prior U.S. Pat. No. 5,207,407 to Fitzsimmons et al.

In Fitzsimmons et al. '407, a hollow tetrahedral base supports the pole and has an interior space for receiving ballast material. The support pole is secured at an angle at a rear portion of the base, so that the backboard mounted on the pole extends beyond the base and over the playing surface. A roller provided in a recess on a leading edge of the base facilitates moving the unit from one location to another. While the support assembly described in Fitzsimmons et al. '407 worked well and was portable, the size of the tetrahedral base made it inconvenient to store and ship in practice, even though the base consisted of two smaller symmetrical sections.

An improvement over this portable goal assembly is described in U.S. Pat. No. 5,415,393 to Fitzsimmons et al., also developed by the assignee of this application. Like the above-described unit, Fitzsimmons et al. '393 utilizes a hollow base that is filled with ballast material and the support pole is mounted on a rear portion of the base at an angle. However, the base of Fitzsimmons et al. '393 is much smaller in height and flatter than the prior tetrahedral base design. Moreover, the base is made from a single body rather than in two sections, and a separate support arm for the pole formed as a planar member is pivotably attached to the front end of the base. The support arm could be collapsed onto and nested on top of the base, as shown in FIGS. 1–2 of the '393 patent, thereby enabling the two-piece support system to occupy a smaller space when disassembled than when assembled, without sacrificing the stability needed for use. Thus, in practice, the unit of Fitzsimmons et al. '393 was easier to ship and store than that in the original Fitzsimmons et al. '407 patent.

A further improved portable goal system is manufactured and sold by the assignee of this application under the CENTER COURT name. The CENTER COURT portable unit is similar to that disclosed in Fitzsimmons et al. '393 in many respects, including the base, which also is substantially flat and hollow, the rearwardly disposed angled pole, and the support pole pivotably attached to the front end of the base. However, the support pole in the CENTER COURT design is not a planar support arm, as in Fitzsimmons et al. '393. Instead, two individual support arms formed as struts are pivotably attached to opposite sides of the front end of the base. The strut members are a less expensive alternative to the planar support arm of the Fitzsimmons et al. '393, and do not result in an appreciable loss of overall stability. Thus, the CENTER COURT unit has the advantage of being lighter in weight and more compact than the portable system of Fitzsimmons et al. '393, without sacrificing stability.

Examples of other conventional, but less desirable, portable basketball systems can be found in U.S. Pat. Nos. 5,259,612 and 5,248,140, both to Matherne et al. These patents disclose portable units also having a hollow base into which ballast material, such as water or sand, is disposed. However, in the two Matheme et al. patents, the pole is mounted vertically in the front portion of the base, and the support arms extend at an angle from the pole to the rear of the base. By setting the pole in the front of the center of gravity of the base in these units, it is easier to topple or "pullover" these units than the rear mounted pole units described above when applying downwardly directed force on the rim of the goal, which is a standard way to measure the stability of a portable unit.

In the foregoing and other conventional goal units, achieving the greatest amount of stability, as measured by the amount of "pullover" force, should always be one of the paramount objects of a portable basketball system manufacturer. One approach to achieve this object is simply to use as much ballast as is practical. However, there are drawbacks to this approach, in that the more ballast to be used, the larger the base must be to accommodate the ballast. In the prior designs in which the base is hollowed to receive ballast, an increase in the amount of ballast necessitates an increased interior volume for the base, which can be accomplished by increasing the surface area, i.e. the footprint, of the base or its height. In the prior designs in which ballast sits on top of the base, it is likely necessary to provide a greater surface area for the base or to increase its strength to accommodate increased ballast. Increasing the size and/or strength of the base, in either type of design, disadvantageously increases the shipping costs, and increases the amount of storage space the unit will occupy.

Another limitation on portable basketball systems that is particularly applicable to a larger system is the support pole. Conventionally, portable systems have utilized steel poles having circular cross-sections to support the backboard and goal on the base. These round poles have typically been either 3 inches or 3.5 inches in diameter. In general, these size round poles have limited the amount of loading that can be applied to a portable system. Some known portable systems have used poles having square cross-sections, and at least one has used an oval cross-sectioned support pole. However, these pole shapes are not easily adaptable to existing support structure hardware, including elevators and extension arms.

The foregoing demonstrates that there is a need for a portable basketball support system that provides greater stability and can carry heavier loads than heretofore practical without increasing the shipping/storage footprint of the system, and without sacrificing portability. There are also needs for a large portable unit that is more easily assembled and disassembled than heretofore possible, and for a stronger, more stable support pole that does not use more material than conventional round poles, but still may be used with conventional elevators and extension arms.

SUMMARY OF THE INVENTION

The invention meets the above needs, and avoids the disadvantages and drawbacks of the above-described art by providing a portable basketball support system having a base and a ballast member, which is separate from the base. The ballast member and base are engageable in a first position when the unit is assembled for use and a second position for shipping or storage that occupies less space than the first position. In the assembled configuration, the ballast member preferably extends beyond the rear of the base to increase the pullover force required to topple the unit and provide more stability. A support pole preferably is mounted at the rear of the base. Thus, by extending the ballast member beyond the rear of the base, both the advantages of rearwardly disposed ballast and a rearwardly disposed pole may be achieved.

In the reduced volume storage/shipping configuration, the ballast member, which preferably is in the form of a tank, is almost entirely nested beneath the base, and is retained within the profile of the base. The overall length of the base and ballast tank when stored is thus reduced as compared to the overall length when assembled for use. In addition, because the underside of the base is adapted to receive the ballast tank, the overall thickness or height of the base and ballast tank assembly when stored is thus reduced as compared to their overall thickness or height when assembled for use. The portable support system of the invention can thus provide greater stability during play, while occupying less space when shipped or stored than would be possible in the previous conventional designs providing comparable performance.

The invention also meets the need for an improved support pole by providing an irregularly-shaped support pole, preferably having a unique "pear"-shaped cross-section. Specifically, the cross-section has a large curved portion at one end, a smaller curved portion at the opposite end, and a relatively straight section connecting the two curved ones. The pole is significantly stronger than conventional round or square poles of the same height and wall thickness, and when the large curved portion is formed as a semi-circular section having a radius of about 1.5 or about 1.75 inches, the pole of the invention may advantageously be used with existing support structure, such as elevator or extension arm systems.

In yet another aspect of the invention, an advantageous method of making the main components of the support system, i.e., the base, ballast tank, and support arm, from plastic materials, preferably land fill-destined plastic, is provided. The method involves molding a component such as the support arm integrally with a graphics sheet. This is accomplished generally by placing a printed graphics sheet in a mold with the printed side facing the mold. Molten plastic to form the component, e.g., by compression molding, is introduced into the mold behind the graphics sheet. The heat from the molten plastic causes the back surface of the graphics sheet to melt into the molten plastic. When the plastic cools, the graphics sheet is integrally molded with the component, providing a more durable and aesthetically pleasing graphic than conventional methods such as, painting, silk screening and decals provide.

BRIEF DESCRIPTION OF THE DRAWINGS

FIG. 4 is a bottom view of the base shown in FIG. 3.

FIG. 5(*b*) is a simplified, cross-sectional view of the base taken along section line 5*b*–5*b* in FIG. 4.

DETAILED DESCRIPTION

Figure 1:
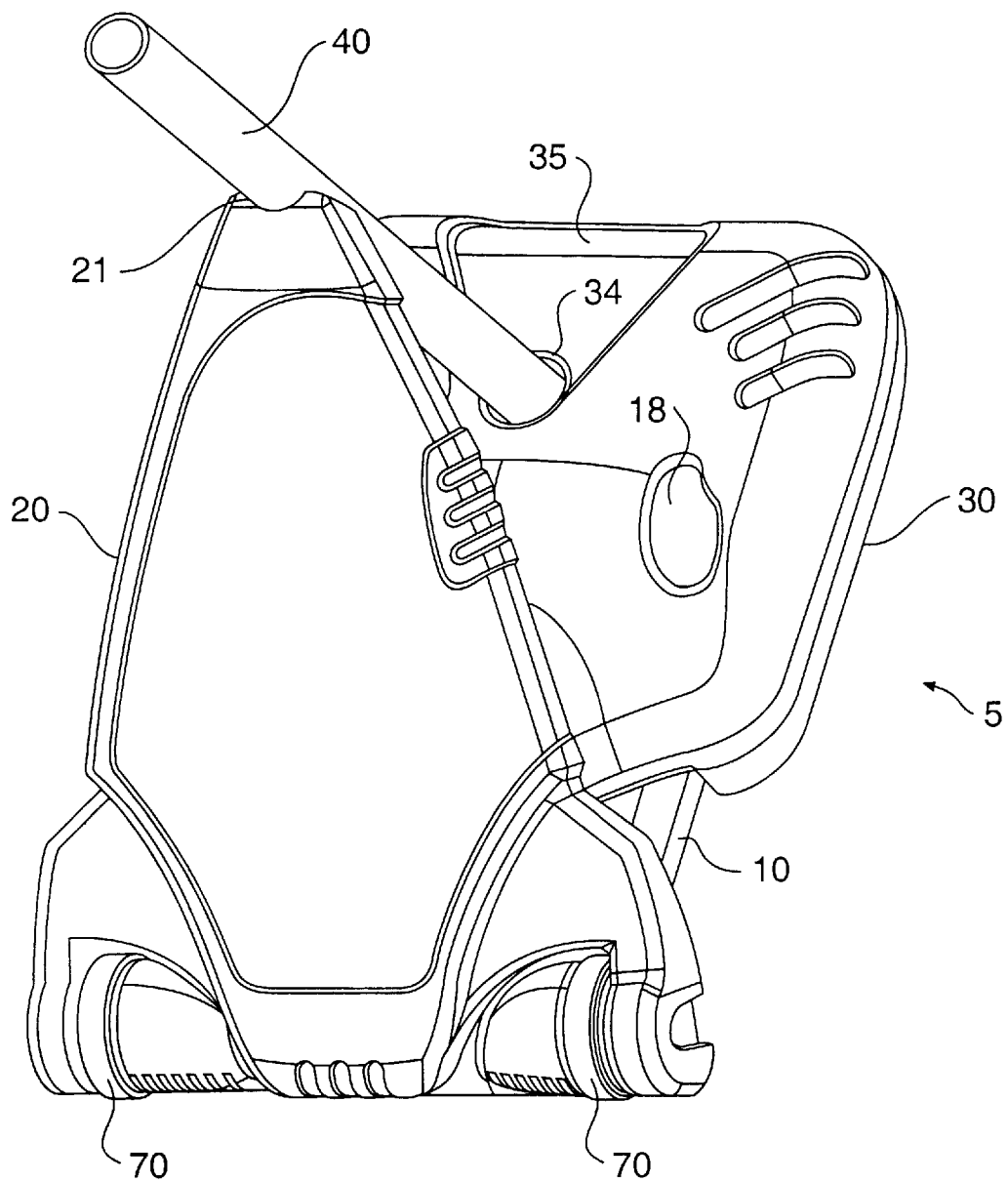
FIG. 1 is a top perspective view of a portable support system for a basketball goal assembly constructed according to the principles of the invention, which illustrates the base, ballast tank, and pole support arm in their assembled configuration.
Figure 2:
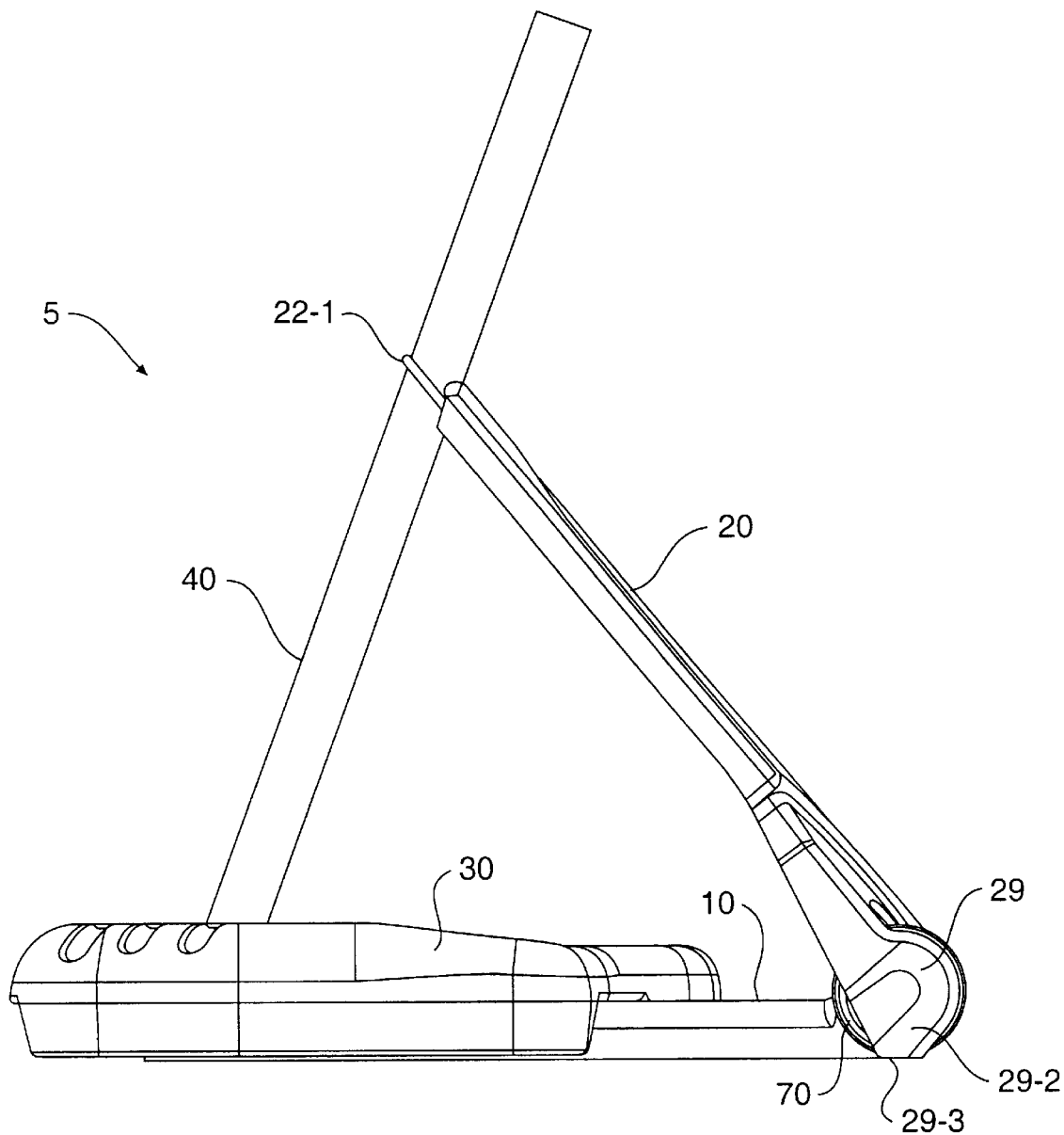
FIG. 2 is a side, elevational view of the portable system shown in FIG. 1.
Figure 14:
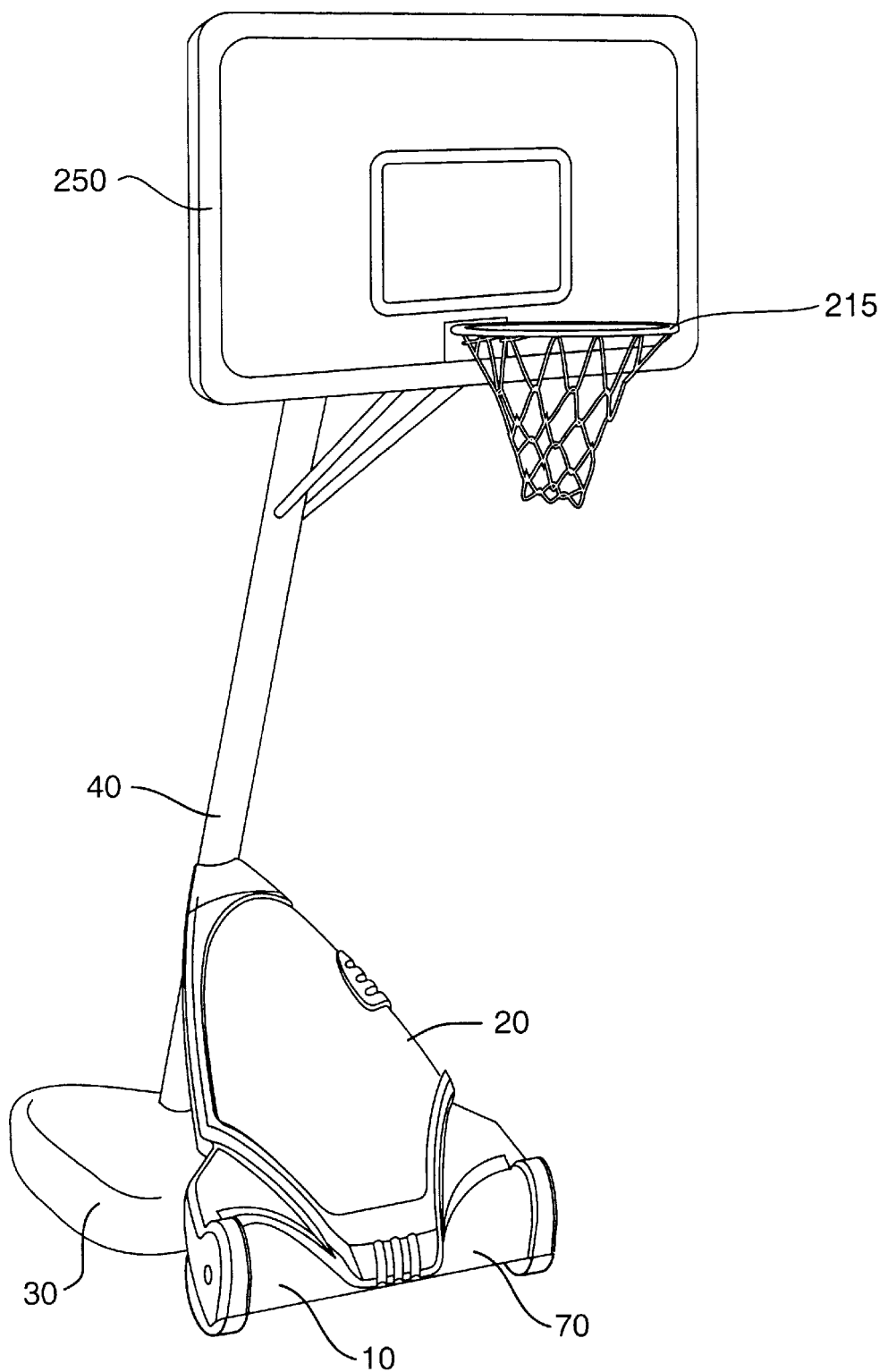
FIG. 14 is a perspective view showing the portable system of the invention supporting a large backboard and goal assembly.

A portable support system for a basketball goal assembly constructed according to the principles of the invention is illustrated in its assembled position in FIGS. 1–2. The portable support system is denoted generally at 5, and has three main components: a base 10, a pole support arm 20 formed as a generally planar member pivotally connected to one end to the base, and a separate ballast tank 30 positioned on top of and at the rear of the base. These main components cooperate to support a basketball backboard and goal assembly on a pole mast as shown in FIG. 14. The pole mast is typically formed in several pieces and only the lowermost section 40 of the pole mast is illustrated in FIGS. 1–2. The upper section(s) of the pole mast may carry an extension arm, elevator, or other structure that supports the basketball backboard and goal assembly on the pole mast in the manner shown in FIG. 14, for example. FIG. 14 illustrates the portable system of the invention supporting a large, and particularly advantageously constructed acrylic backboard having a molded plastic frame in accordance with the assignee's copending application Ser. No. 08/593,321, entitled Molded Frame Backboard Assembly and Method of Making Same, filed simultaneously herewith. However, any conventional basketball backboard and goal assemblies may be employed with the portable support system of the invention. The invention is particularly advantageous when used with adult-sized basketball equipment for regulation play because it increases the stability and improves the performance over conventional equipment. Examples of other advantageous equipment, such as extension arms, elevators, basketball backboards, and goals, which may be used with the invention are disclosed in the assignee's following patents and patent applications, the disclosures of which are incorporated by reference herein: U.S. Pat. Nos. 4,583,732 to Allen (goal); 4,826,162 to Allen (goal); 5,066,007 to Niver (goal); 5,292,118 to Allen et al. (elevator); and 5,470,054 to Bohrnan (extension arm); copending patent application Ser. No. 08/282,521 for Breakaway Goal Unit; and parent application Ser. No. 08/190,914, which discloses a molded plastic backboard with in-mold graphics. As described in more detail below, the in-mold graphics molding principles described in Ser. No. 08/190,914 advantageously may be used to form the plastic members of this invention, especially the support arm 20.

In the assembled configuration of the invention illustrated in FIGS. 1–2 and 14, the ballast tank 30 is secured at the rear of the base 10 and preferably extends longitudinally beyond the rear of the base to place as much ballast as possible toward the rear of the support system thereby increasing the overall footprint of the device 5, but not beyond reasonable constraints. By placing the ballast as far from the front of the base as possible, more pullover force is required, thereby increasing the stability of the system. The lower section 40 of the pole mast is supported at an angle to the base, preferably 20 degrees forward from a straight vertical position. Pole support arm 20 extends from the front of the base to the angled pole mast. By angling the pole forward, the pole is loaded in compression along its longitudinal axis and bending due to the weight of the pole, backboard and attached structure. This loading reduces the tendency of the pole and backboard assembly to wave by transferring a greater load down the pole than if it were in a vertical position. It also allows for use of a pole having a smaller diameter than would be required if a vertically mounted pole were used. As shown in FIG. 1, the support pole extends from a hole 34 in the ballast tank, which may be circular in cross-section to conform the pole.

Figure 3:
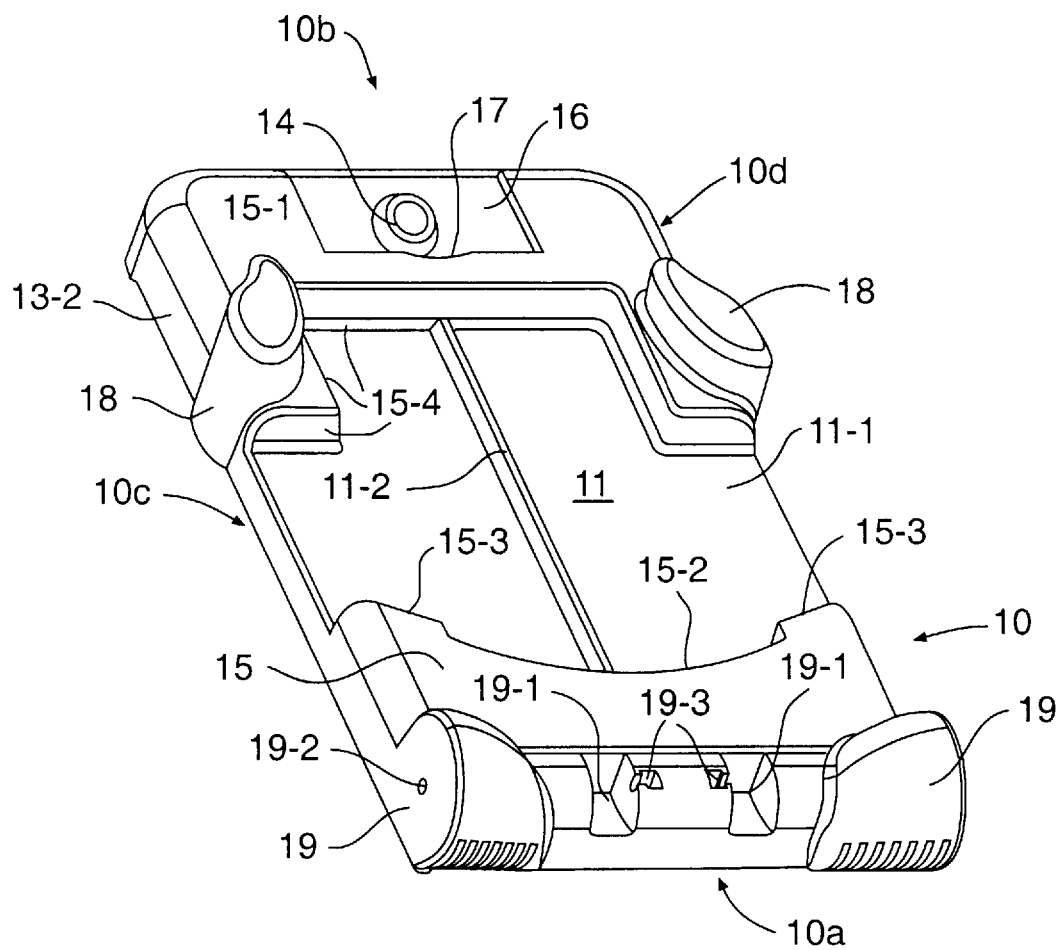
FIG. 3 is a top perspective view, more clearly illustrating the base shown in FIGS. 1–2.
Figure 5B:
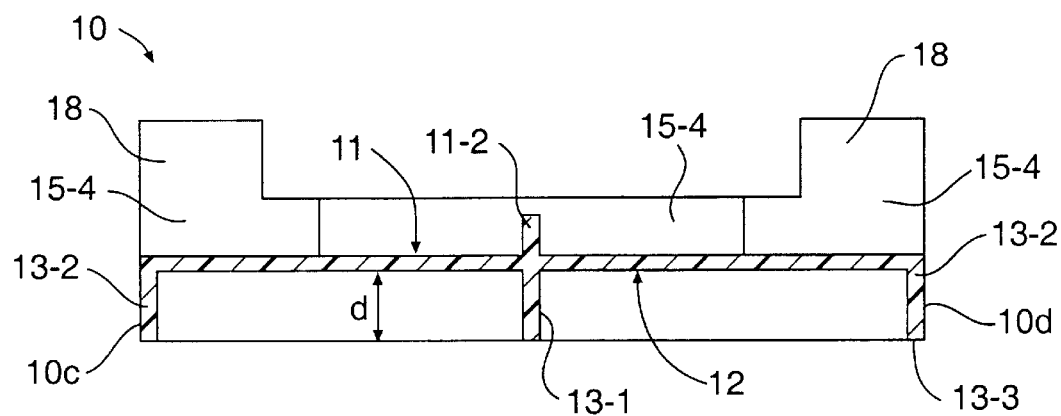
FIG. 5(*a*) is a side elevational view of the base shown in FIGS. 3–4.

The base 10 of the invention is illustrated best in FIGS. 3–5, which show the generally rectangular shape of the base defined by front and rear ends 10a, 10b and sides 10c, 10d. The base also has an upper surface 11, bottom surface 12, and a rim 13-2 extending around the perimeter of the base from bottom surface 12. Rim 13-2 rests upon a playing surface or supporting surface during use. A recess or indentation 11-1 is formed in upper surface 11 to receive the ballast tank when unit 5 is assembled for use. The indentation 11-1 extends between raised portions 15 and 15-1 of the base. The front of the indentation is defined by the rear edge 15-2 of raised portion 15. A vertical wall having two sections 15-3 extends between the surface 11 and raised portion 15. There is no vertical wall extending between wall sections 15-3 to permit tongue-like projections of the ballast tank to fit under raised portion 15 when the ballast tank is received in indentation 11-1, as discussed in greater detail below. Cut-outs 11-3 are formed in the surface 11 as shown in FIG. 4 to facilitate insertion of the tongues. The rear edge 15-2 of raised portion 15 has a profile or contour that generally conforms to the front of the ballast tank. The rear of indentation 11-1 is defined by vertical wall 15-4, which extends upwardly from surface 11 across the base and terminates at raised portion 15-1. The underside of the rear of the ballast tank rests on raised portion 15-1 when the tank is received within the indentation 11. Although indentation 11-1 is depicted in FIG. 3 as having a generally upside-down "T" shape, any number of different shapes could be used for the indentation, as long as it is at least partially shaped to receive and retain the ballast tank 30. Positioning rib 11-2 shown somewhat schematically in FIG. 3 and in FIG. 5(b) projects upwardly from upper surface 11 indentation 11-1. The purpose of rib 11-2 is to mate with a corresponding groove formed on the bottom of the ballast tank to help position and retain ballast tank 30 on the base.

Another part of base 11 that aids in positioning and retaining the ballast tank are columnar supports 18, which may be integrally formed with the base. Columnar supports 18 project vertically upward from raised surface 15-1 at sides 10c, 10d of the base. When the tank is placed on top of the base, columnar supports 18 are received in corresponding holes in ballast tank 30, as shown in FIG. 1. Columnar supports 18 need not be leaf-shaped in cross-section as shown in the drawings, but may have any cross-sectional shape as long as they cooperate with the ballast tank 30 to secure it in a fixed position on top of the base, while at the same time allowing separation of the ballast tank from the base.

At the rear end 10b of the base is an annular support nub 14 projecting upwardly from a declined surface 16 formed in raised portion 15-1. Nub 14 fits within the end of pole section 40 when the pole is mounted to the base, as described below. Because of the angle of decline 16, when pole section 40 is installed around nub support 14, the pole is tilted at approximately the same angle as the decline. A notch 17 may be formed in raised portions 15-1 at one end of decline 16 to receive the pole.

The front portion 10a of the base also includes other features to provide portability and collapsibility. Hub-like structures 19 are formed in the base with openings 19-2 for supporting axles that pivotally attach the support arm to the base and rotatably support wheels 70 (shown in FIG. 1). Notched portions 19-1 are formed in the front portion 10a and include portions 19-3 for rotatably supporting one end of the axles (not shown). Notches 19-1 also facilitate and limit pivoting of the support arm relative to the base, as apparent from the description of the support arm below.

Although base 10 may take many different forms and shapes including that of a hollow closed structure, it is preferable to make the base-receiving indentation 11-1 large and deep as illustrated in FIG. 3, thereby giving it a roughly C-shaped longitudinal cross-section shown best in the side view of FIG. 5(a). The bottom surface 12 of the base 10 is generally flat and may have a reinforcing rib structure 13 integrally formed therewith as shown in FIG. 4. Rib structure 13 is not shown in FIG. 5(b) for clarity. Projecting downwardly from the outer edge of bottom surface 12 is the rim 13-2, which extends around the perimeter of the bottom of base, at all four of the sides 10a, 10b, 10c, and 10d, (represented in FIG. 4 by the darkened line 13-2). Thus, the underside of the base 10 essentially is an open-faced box, as evident from FIG. 4 and the simplified cross-section shown in FIG. 5(b). Forming the bottom of the base in this manner enables at least a portion of the ballast tank to be nested within the underside of base (by the distance d between the bottom surface 12 and upper edge 13-3 of rim 13-2). This nesting helps provide a reduced volume assembly for shipping or storage, as discussed subsequently. To help locate and retain ballast tank 30 in this nested position, a positioning rib 13-1 projects upwardly from the bottom surface 12. Rib 13-1 mates with a corresponding groove on the bottom of the ballast tank described below.

Figure 6:
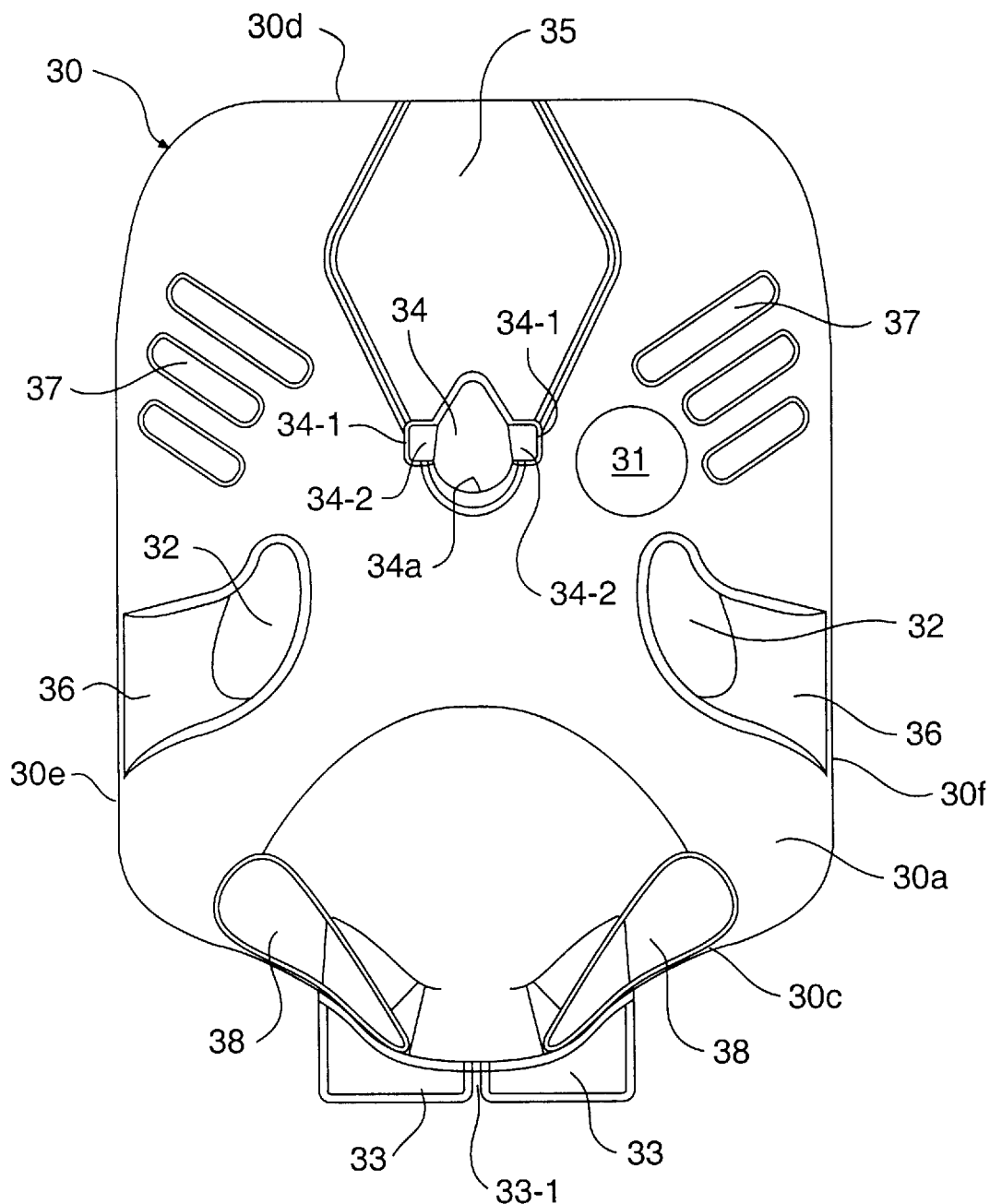
FIG. 6 is a top view of a ballast tank of the invention.
Figure 7:
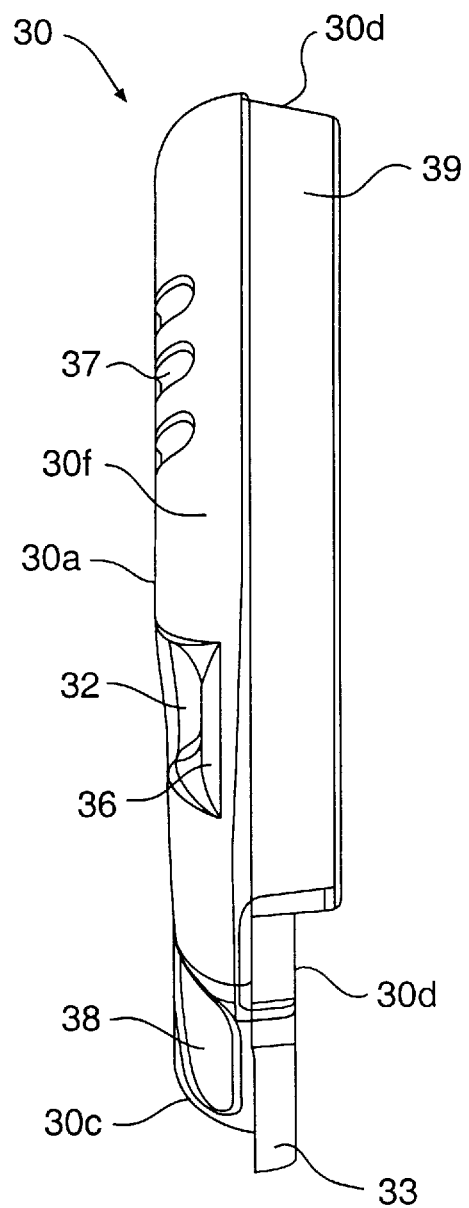
FIG. 7 is a side elevational view of the ballast tank shown in FIGS. 6.

The ballast tank 30 of the invention is shown in FIGS. 6–9 as a generally rectangular member somewhat wider than base 10, and has a top surface 30a, a bottom surface 30b, front and rear ends 30c, 30d, respectively, and sides 30e, 30f. Ballast tank 30 is substantially hollow so it can be filled with ballast material, such as water or sand or other suitable material, as is known in the art to provide the requisite stability for the system during play. Fill hole 31 is in communication with the interior of ballast tank 30, to allow the tank to be filled and emptied as necessary. Although only one fill hole is shown in FIG. 6, multiple fill holes may be provided.

Figure 8:
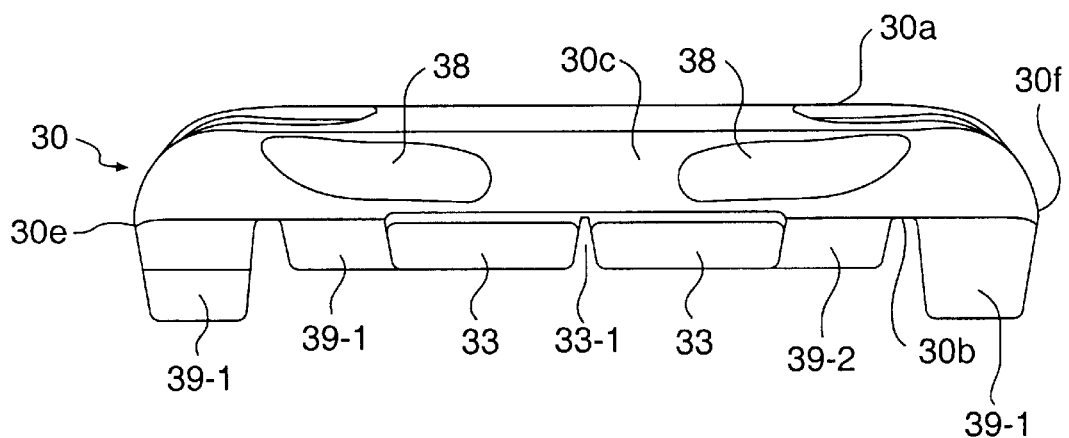
FIG. 8 is a front view of the ballast tank shown in FIGS. 6–7.
Figure 9:
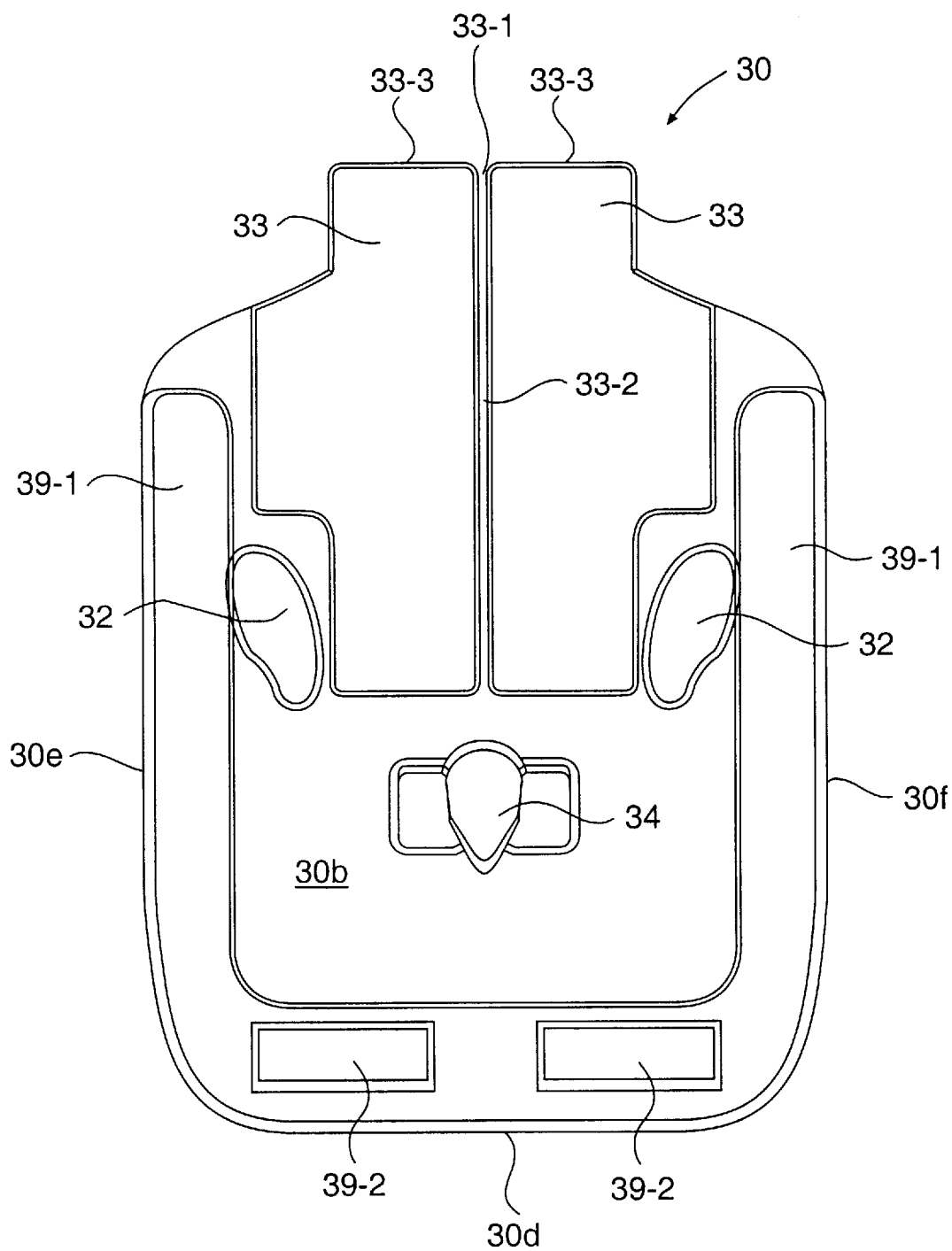
FIG. 9 is a bottom view of the ballast tank shown in FIGS. 6–8.

Ballast tank 30 is formed with positioning holes 32 passing through the entire thickness of the tank for receiving columnar supports 18 in the expanded position as discussed above. Ballast tank 30 may also be provided with forwardly extending tongues 33, which are received in the mating cut-out portions 11-3 and positioned under base portion 15 as the tank is placed within indentation 11-1 of the base. The front portion 30c of the tank has a shape that generally conforms to the profile or contour of the rear edge 15-2 of the base so the tank mates well with the base in this position. FIGS. 8–9 show that tongues 33 preferably are separated by a substantially centrally located recess 33-1 therebetween. Extending longitudinally along the bottom surface 30b of ballast tank 30, in line with recess 33-1, is central groove 33-2 shown best in FIG. 9. Groove 33-2 receives the top rib 11-2 of the base when the ballast tank is positioned on top of base 10, and it receives bottom rib 13-1 when the ballast tank is disposed on the bottom of base 10. Thus, groove 33-2 helps to position the ballast tank and keep it securely in place in both the storage/shipping and expanded configurations.

Projecting downwardly from the bottom surface 30b of ballast tank 30 at the sides 30e and 30f are longitudinal members 39-1, which also may be hollow. When unit 5 is assembled for use in its expanded position, longitudinal members 39-1 extend over the sides 10c, 10d of base 10, as shown in FIG. 1. Projecting downwardly from the bottom surface 30b at the rear end 30d of the tank are rear stop members 39-2, which extend over the rear portion 10b of base 10 in the expanded position.

The ballast tank 30 also has a hole 34 extending therethrough, which receives pole section 40 when the ballast tank 30 is mounted in indentation 11-1 on the base. As shown in FIG. 6, hole 34 is specially shaped to permit the support pole of the invention, which has a particularly advantageous cross-sectional shape described below, to extend through the ballast tank. The ballast tank hole 34 also accommodates conventional round poles because the front portion 34a of the hole 34 is formed as a semi-circle. Thus, although the ballast tank could have a circular hole formed to receive circular poles as shown in FIG. 1, the "pear"-shaped hole 34 of FIG. 6 is preferred due to its versatility. Adjacent to hole 34 are integrally formed cut-out portions 34-1, which terminate in ledges 34-2. Cut-out portions 34-1 receive a pin member described below that extends through the support pole. The pin member is part of a clamping mechanism described below that secures the pole, base, and ballast tank together. Immediately to the rear of hole 34 in FIG. 6 is a platform 35 designed to receive a separate supplemental ballast tank (not shown), which may be placed thereon to provide even greater support, if desired, for further stability. Of course, different types of supplemental ballast members known in the art may be employed instead of a tank. The top surface 30a of the tank may be integrally formed with cut-out portions 36 and 38, as well as grooves 37, for aesthetic effect and appeal.

Figure 10:
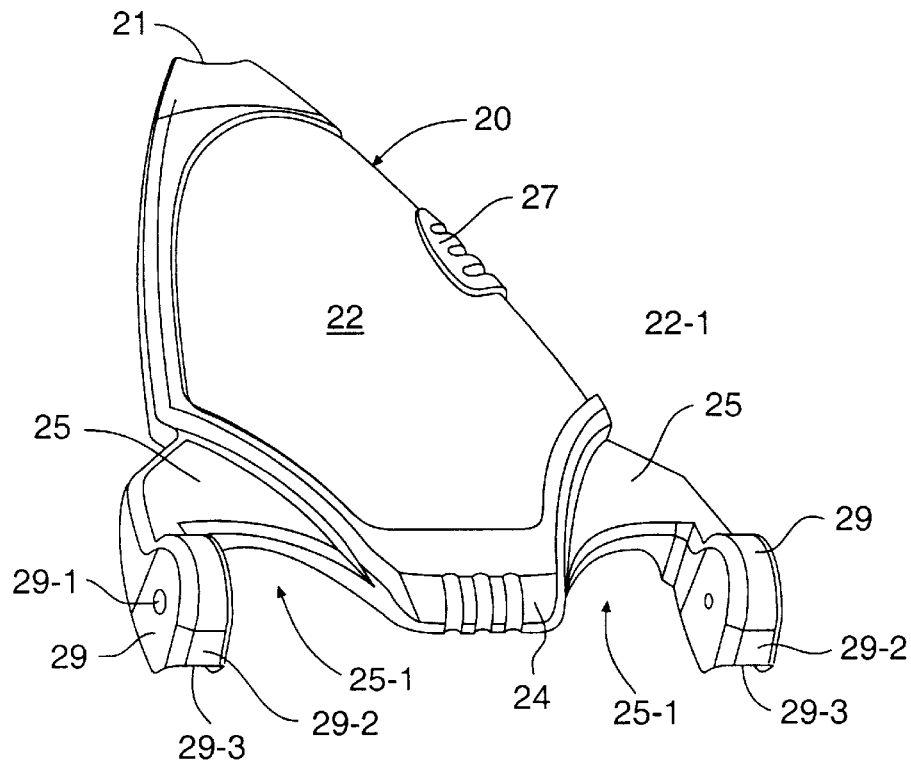
FIG. 10 is a top perspective view of a pole support arm of the invention.
Figure 11:
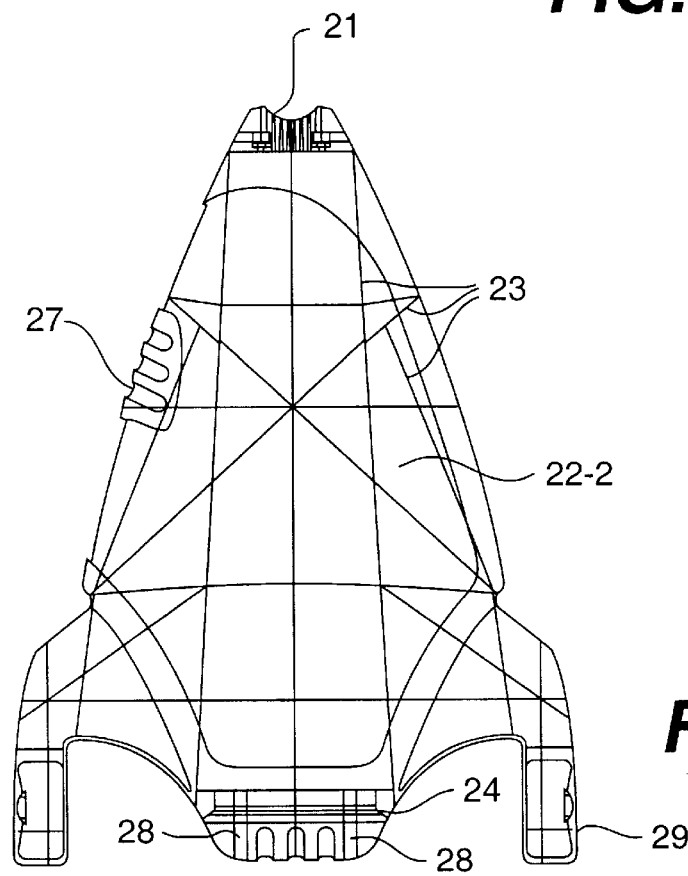
FIG. 11 is a bottom view of the pole support arm shown in FIG. 10.

The third main component of the support system is support arm 20, which is shown best in FIGS. 10 and 11. Support arm 20 has a generally triangular, substantially planar shape defined by a main body 22 and two integrally formed extensions or brackets 25. The arm has a top surface 22-1 and a bottom surface 22-2. Top surface 22-1 may be substantially flat and have a graphics sheet integrally formed therewith in accordance with a further aspect of the invention described below. As shown in FIG. 11, the bottom surface 22-1 of support arm 20 is provided with integrally formed ribs 23 for reinforcing the support arm 20. At the ends of brackets 25 are mounting bases 29 having a central bore 29-1 formed therethrough. The mounting bases 29 are integrally formed at the ends of bracket 25 to define open portions 25-1 between the mounting bases 29 and the bottom end 24 of the arm. Open portions 25-1 receive wheel mounts 19 when the arm 20 is connected to the base. Wheels 70, as shown in FIG. 1, are disposed between the mounting bases 29 and wheel mounts 19. Each wheel is rotatably supported in a conventional manner by an axle (not shown), which extends through the wheel and the bore 19-2 in the wheel mount and has an end received in notched portion 19-3 of the base. The other end of the axle is rotatably supported in the bore 29-1 in the mounting base. The ends of the axle are rotatably supported in any conventional manner known in the art. This wheel mounting structure also serves to pivotally attach the support arm 20 to the base. The arm may include an integrally molded groove portion 27, which can serve as a handle enabling one to pivot the support arm 20 in a convenient fashion.

Mounting bases 29 may be roughly circular, to conform with the profile of the wheels, and are preferably formed with an eccentric extension 29-2, which prevent rotation of the wheels as a safety feature. The extensions have a bottom portion 29-3 upon which the front of the unit 5 is supported in the assembled position, as shown in FIG. 2, in a manner that prevents the wheels from touching the ground. When support arm 20 is pivoted up away from base 10 to the assembled position, extensions 29-2 rotate around the axle and make contact with the ground. The extensions have a greater length than the diameter of the wheels 70, such that wheels 70 do not contact the ground when extensions 29-3 do. Thus, when unit 5 is assembled for use (i.e., support arm 20 is at an angle as shown in FIG. 2), wheels 70 do not reach the ground, and the unit cannot roll. Moreover, when the assembled unit is titled forward past the position shown in FIG. 2 to transport it, the wheels do not contact the ground until the unit is tilted a predetermined amount and the eccentric extensions are rotated rearwardly and upwardly off the ground. The wheels then engage the ground, but only after the unit is tilted forward a predetermined amount, which is advantageously selected to be large enough that a person can control the unit without it rolling towards or away from him unexpectedly.

The bottom surface 22-2 of the support arm has a pair of forked members 28, having recessed portions between the arms of the forks, which are adapted to be received in notched portions 19-1 formed in the base 10. The arms of the forks extend around the axle (not shown). The forked members 28 abut against the front portion 10a of the base 10 to limit rotation away from the base to a predetermined amount. Of course, this rotation limitation feature only comes into play when the support arm 20 is not connected to the support pole. Alternatively, the support arm may be designed to rotate completely around to the bottom of the base and provide another collapsed position. Grooves and/or ridges may be provided on one of the support arm and the base to secure the support arm to the base in the collapsed position.

Figure 13A:
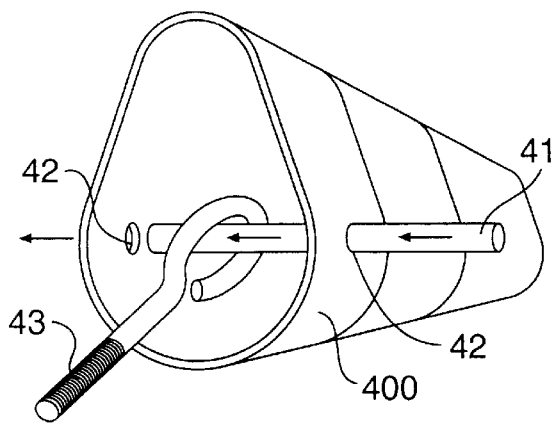
FIGS. 13(*a*)–(*e*) are schematics showing the connecting of the support pole of the invention with the base and ballast tank of the invention.
Figure 13B:
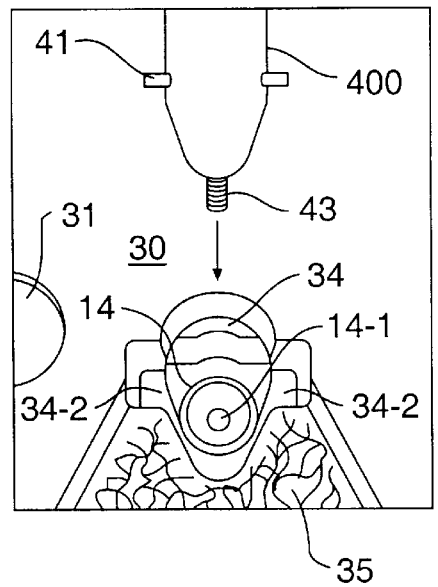
Figure 13C:
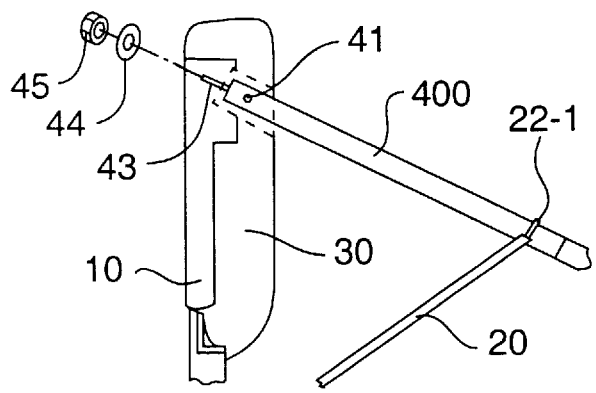
Figure 13D:
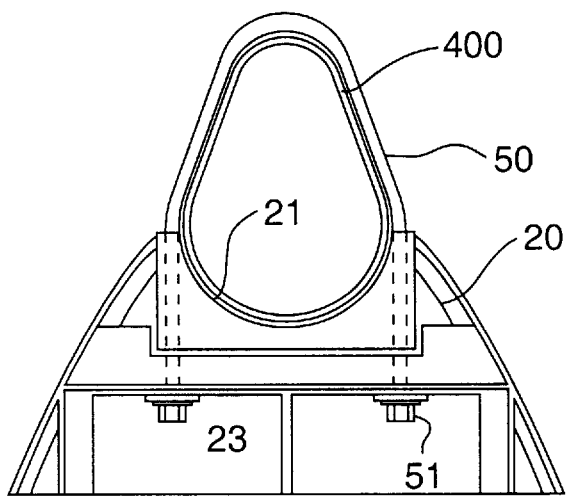

The top of the support arm may be notched at 21 as mentioned above to receive the support pole. Bores may be integrally formed in the bottom surface 22-2 of the support arm to receive a clamp assembly, which attaches the pole to the support arm, as shown in FIG. 13(d). While the support arm is shown as a planar member it may also be formed as separate strut members connected between the base and the support pole.

Figure 12:
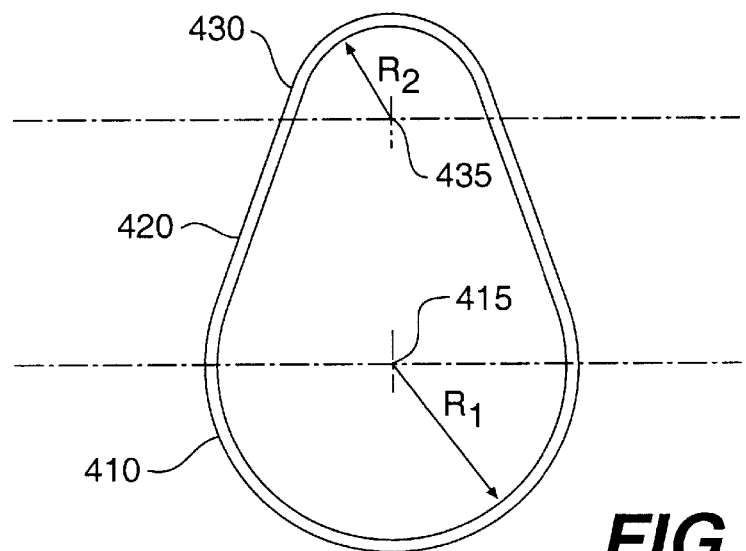
FIG. 12 is a cross-sectional view of a support pole of the invention.

According to another aspect of the invention, a support pole is provided with a specially formed cross-section illustrated in FIG. 12. The support pole 400 of the invention can be described as having a generally "pear-shaped" cross section defined by a large curved section 410 and a small curved section 430, which are connected by relatively straight side sections 420. Curved section 410 is preferably semi-circular in shape for reasons discussed below and has a center of curvature at point 415. Small curved section 430 may be formed as an arc subtending less than 180 degrees, i.e. a little less than a semi-circle, and has a center of curvature at point 435. Side sections 420 may be straight, but are preferably slightly curved. Large curved section 410 preferably has a radius of curvature of $R_1$, and tapered curved section 430 has a radius of curvature of $R_2$. In all cases, $R_1$ is greater than $R_2$, and the radii of curvature (not shown) of side sections 420 are substantially greater than $R_1$.

The support pole 400 may be made from conventional materials known in the art such as hot rolled steel, cold rolled steel, and aluminum, with hot or cold rolled steel being preferred. The poles also can be made from plastic materials using such known processes as filament winding and pulltrusion, but these processes currently are too expensive to be practical. The pole may be formed in sections, typically three, and the ends of the pole sections may be tapered and reduced, as with conventional poles to facilitate connecting the sections.

The advantages of this particular cross-sectional pole design lie in its strength and adaptability for use with existing backboard mounting hardware. This "pear"-shape is significantly stronger than a conventionally shaped round or square pole using the same amount of material, and assuming equal height and wall thickness. In one particular example of this aspect of the invention, a pole was constructed having a large curved section with a radius $R_1$ of 1.75 inches forming a semi-circle, and a small curved section having a radius $R_2$ of 0.875 inches subtending an arc just less than 180° and therefore not being perfectly semi-circular. The side sections 420 were formed with radii of curvature of 10.0 inches and, therefore, were only slightly curved. The overall perimeter of the pole was approximately 14.5 inches. Testing revealed that this pole was about 250% stronger than a conventional round pole having a 3.5 inch diameter, and approximately equal in strength to a 4.0 inch square pole having a perimeter of 16.0 inches.

Despite the unique shape of pole 400, when $R_2$ is selected to be 1.50 or 1.75 inches as in the example above, it may be used with existing elevator and extension arm systems. This radius makes the curved section 410 essentially identical to the front half of a conventional 3.0 or 3.5 inch round pole. By disposing curved section 410 facing toward the front of the portable system of the invention, i.e. closer to the playing surface, a conventional elevator and/or extension arm, or other mounting hardware for 3.0 or 3.5 inch poles may be used. In addition to its increased strength, pole 400 has added aesthetic advantages over conventional round poles. Specifically, the pole gives the appearance of seeming larger than it is, when viewed at certain angles. Round poles, by contrast, look the same at every angle.

Figure 15A:
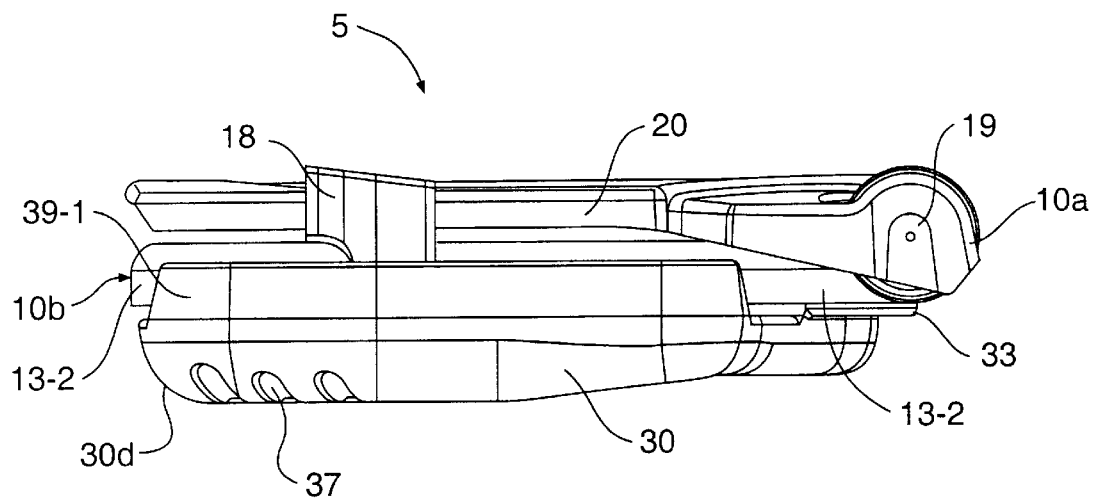
FIG. 15(a) is a side elevational view illustrating a base, ballast tank, and support arm of the invention in their storage or shipping configuration.

The portable support system of the invention may be used as follows. When the unit is shipped to a consumer, or when it is desired to store the unit, the main components are configured as depicted in FIG. 15(a). The ballast tank 30 is turned upside down exposing rear surface 30b and central groove 33-2. The support arm 20, which has been connected to the base previously, is pivoted downwardly towards the top of the base such that it lies between columnar supports 18 and rests against rear raised portion 15-1. The rear end 10b of the base then is positioned adjacent the rear end 30d of the ballast tank by aligning the central rib 13-1 of the base within central groove 33-2 of the ballast tank, and the longitudinal members 39-1 of the ballast tank are positioned outside the base rim 13-2. When nested together in this manner, the tongues 33 lie adjacent the inside of the rim 13-2 at front end 10a of the base and the rear members 39-2 lie adjacent the inside of the rim 13-2 at rear end 10b of the base to limit relative longitudinal movement between the base and ballast tank. Either or both of the rib and groove arrangement and the longitudinal members 39-1, which are in close proximity to base sides 10c, 10d, limit the relative lateral movement between the base and ballast tank. By retaining rear stop members 39-2 and tongues 33 within rim 13-2, the ballast tank 30 is stored in a more compact position than that employed during use when the tank 30 extends rearwardly of base 10. Thus, the overall length of the unit when it is shipped or stored is reduced. Moreover, ballast tank 30 is nested underneath the bottom of base 10 because the bottom surface 12 is disposed below upper edge of the rim 13-2. As a result, the overall height of thickness of the unit in its shipping/storage configuration is also reduced. Of course, the units may also be nested in this same compact configuration by turning the base upside down such that the support arm lies on the ground or other surface, and the ballast tank is positioned on top of lower base surface 12, which is now facing upward. This position is illustrated by turning FIG. 15(a) upside-down.

When it is desired to assemble unit 5 for use, ballast tank 30 is separated from the underside of base 10 and the base is positioned with its wheels on the ground as shown in FIG. 2. The ballast tank is then positioned within indentation 11-2 in the manner described above in which tongues 33 fit in cut-outs 11-3, central groove 33-2 receives positioning rib 11-2, rear members 39-1 extend beyond base 10, and longitudinal members 39-1 lie adjacent the sides 10c, 10b of base 10. FIGS. 13(a)–13(e) show how a lower section 40 of a "pear"-shaped support pole 400 may be connected to the base. A circular cross sectional pole would be connected in a similar manner. As shown in FIG. 13(a), support pole 400 is provided with cross-bolt 41, which passes through holes 42 disposed on opposite sides of support pole 400 near the bottom end of the pole. Cross-bolt 41 is threaded through the eye of an eyebolt 43, so that eyebolt 43 extends out of the open end of the pole. Cross-bolt 41 is longer than the width (or, in the case of the circular pole, the diameter) of pole section 40, so that the ends of cross-bolt 41 project from the sides of pole section 40 as shown in FIG. 13(b). Pole section 40 is then inserted into hole 34 of the ballast tank (which has been placed on the base) so that the ends of cross-bolt 41 are received in cut-outs 34-1 and rest against the bottom ledge 34-2 of the cut-outs. In this position, the lower end of pole section 40 fits around support nub 14 on base 10. Eyebolt 43 passes through a small opening 14-1 in the base within the support nub 14. As shown in FIG. 13(c), the eyebolt is then fixedly secured to base 10 via a plate 44 and nut 45, which attaches to the threaded end of the eyebolt 43. By tightening nut 45, the ends of cross-bolt 41 are urged and retained against ledges 34-2, thereby securing not only the pole to the base but also the ballast tank, which is trapped between the cross-bolt 41 and base 10. Of course, any other conventional means may be used to secure the pole, base, and ballast tank together.

Figure 13E:
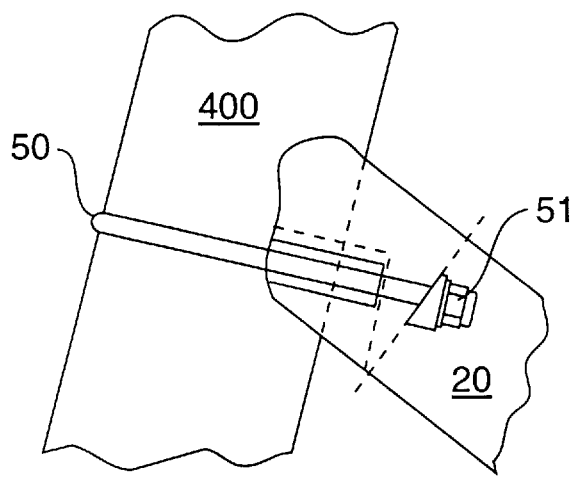

After the lower pole section and ballast tank are connected to the base, the support arm may be connected to the pole by a generally "U"-shaped clamp or other suitable retaining member, which surrounds the pole section 40 and is connected to the support arm to prevent backward movement of the pole. A more detailed description of the type of U-clamp connection that may be used to attached circular poles to a support arm 20 is shown in FIG. 5 of U.S. Pat. No. 5,415,393 to Fitzsimmons et al., the disclosure which is incorporated by reference herein. FIGS. 13(d)–(e) show how a similar clamp is attached to the "pear"-shaped pole 400 of the invention. First, support arm 20 is then pivoted up away from base 10, and the pole is rested in notch 21 of the arm. A generally U-shaped member 50, which has been formed to conform to the "pear"-shaped cross section of the pole, has threaded ends placed in bores in the notched end of front cover 20. Nuts 51 are used to tighten the clamp against the pole thereby securing it to the front cover.

Next, ballast material such as sand or water may be added to ballast tank 30 via fill hole 31. Then, the remaining pole sections, backboard support assembly, backboard and goal may be attached in the conventional ways known in the art.

Figure 15B:
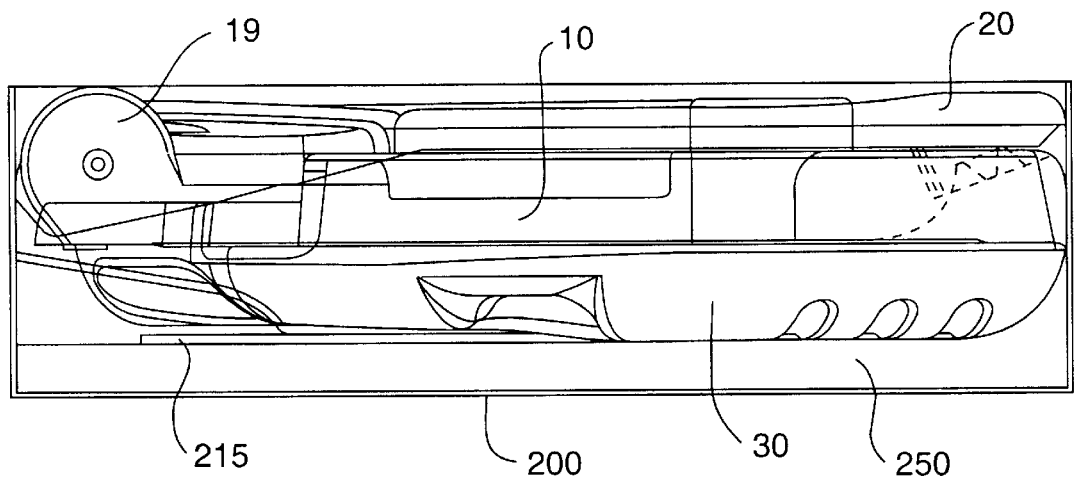
FIGS. 15(b)–(d) are side, top, and front schematics, respectively, of the support system of the invention in a shipping carton.
Figure 15C:
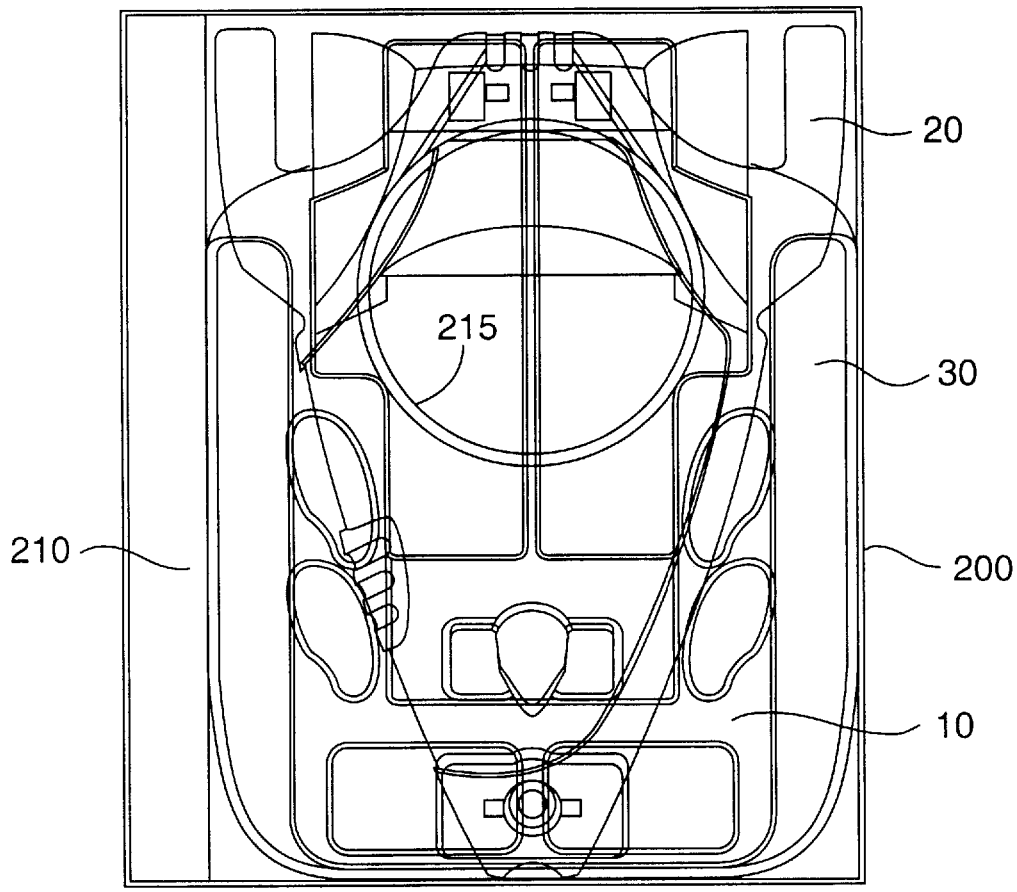
Figure 15D:
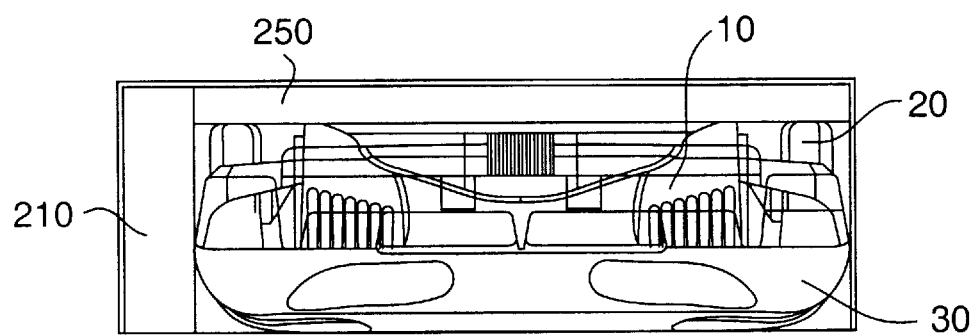

By providing components that nest within one another when disassembled, as shown in FIG. 15(a) and described above, the invention minimizes the amount of space the system occupies when shipped or stored. One example of how the components can be nested for shipping from the manufacturer is demonstrated schematically in FIGS. 15(b)–(d). First pole carton 210, which may contain the sections of the pole and associated hardware, is placed inside shipping carton 200 on one side, as shown in FIGS. 15(c)–(d). Next, basketball goal 215 (see FIG. 15(b)) and assorted other hardware (not shown) are placed next to pole carton 210, and may be covered with a separator sheet. Then, as shown in FIG. 15(b), ballast tank 30 is placed, bottom side up, in shipping carton 200 on top of the goal 215. The cut-out portions 38 provided in the front of ballast tank 30 receive the support arms of the goal. Then, an extension arm for mounting the backboard on the support pole is placed in the recessed area on bottom surface 30b of the tank between hole 34 and rear end members 39-2. Next, the base 10 and support arm 20 are then placed on top of ballast tank 30. As noted above, support arm 20 folds into base 10, and the bottom of the base 10 nests into the underside of ballast tank 30. Elongated members 39-1 extend around the sides of base 10, thereby ensuring the base does not shift excessively in the shipping carton during shipping. A separator sheet (not shown) may be placed over the support arm, base, and ballast tank before the backboard is placed into the container. Alternatively, the backboard could be placed in first as shown in FIG. 15(b). Finally, the carton cover (not shown) is put on shipping carton 200, and the carton is glued shut and ready for shipping.

The base, ballast tank, and support arm of the invention are advantageously formed as separately molded plastic members. In particular, base 10 and support arm 20 preferably may be formed from 100% landfill-destined recycled plastic, which may include a blend of different materials. An example of such a blended material is sold by Composite Technologies Corporation of Dayton, Ohio under the REDEX name. The preferred method of forming base 10 and support arm 20 is compression molding. Ballast tank 30 may be formed from a polyolefin material, preferably polypropylene. The preferred method of forming ballast tank 30 is roto-molding. Of course, other materials and methods may be used to form the components of the invention.

Many variations in the precise structure of the components of the invention described above may be made. For example, although the bottom surface 30b of the ballast tank cooperates with the top surface 11 of the base in the assembled configuration, and with the bottom surface 12 of the base in the shipping/storage configuration, a ballast tank may be used in which the top of the tank engages the bottom of the base in the storage configuration, while the bottom of the tank engages the top of the base in the assembled configuration. In this case, grooves and positioning members could be disposed on both the top and bottom portions of the ballast tank. Similarly, the top of the ballast tank may engage both the top and bottom of the base in the assembled and stored configurations, respectively.

Figure 16:
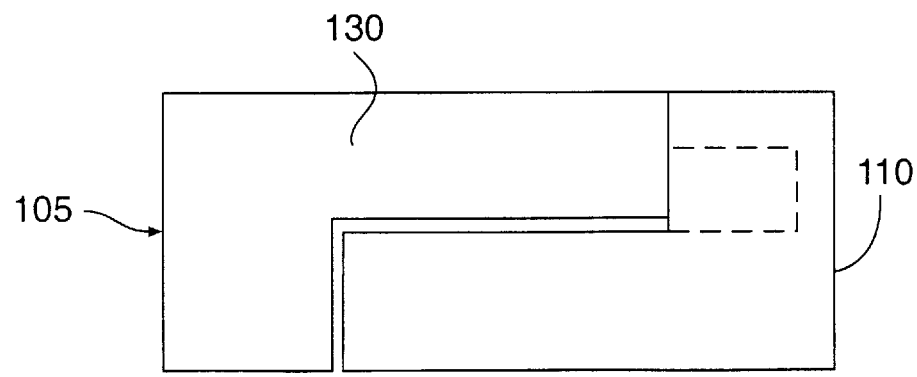
FIG. 16 is a side elevational schematic of a second embodiment of the invention, illustrating the base and the ballast tank in the storage or shipping configuration.
Figure 17:
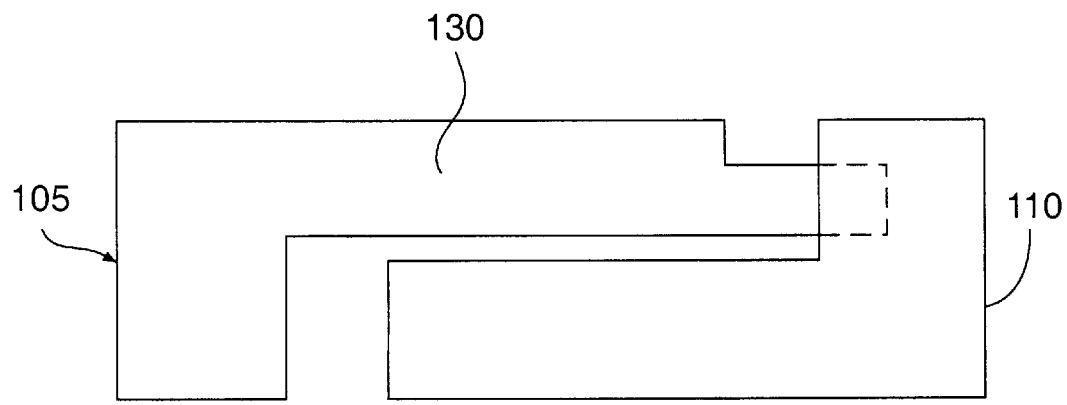
FIG. 17 is a side elevational schematic of the base and ballast tank of FIG. 16 in the assembled configuration.

In all of the above-described variations on the invention, the ballast tank is on one side of the base in one configuration and on the other side of the base in the other configuration. In a second embodiment of the invention, the ballast tank may remain on the same side of the base for both configurations. As illustrated schematically in FIGS. 16 and 17, the ballast tank 130 is disposed on top of base 110 in both the compact configuration for storage (FIG. 16) and the expanded configuration for use (FIG. 17). In FIG. 6, ballast tank 130 is positioned near the rear of base 110, while in FIG. 17 it extends backwardly to place more ballast rearward. Suitable aligning and positioning members may be provided to secure the ballast tank in the compact and expanded positions. Thus, it is clear that any structure permitting the ballast tank to be movable with respect to the base and occupy different positions for shipping/storage and use may be used to carry out the principles of the invention.

In another aspect of the invention, a printed graphics sheet may be integrally molded with one or more of the main components of the support system when these components are being formed. The graphics sheet then is bonded to the component during the molding operation, e.g. compression molding, such that the graphics sheet is in-molded with the component. For instance, the base 10 or preferably the front surface 22-1 of the support arm, which is the most visible component during use as shown in FIG. 14, may include in-mold graphics. When the support arm is formed by compression molding, the graphics sheet may be integrally formed with the arm in the following manner.

First, a graphics sheet, having a printed side and an unprinted side, is placed printed side down inside a mold at a predetermined position. The graphics sheet may be positioned manually, or it may be placed in the mold by use of a positioning tool such as a robotic arm or the like. Further, the mold may be provided with a positioning rib that conforms to the perimeter of the graphics sheet, to aid in proper placement of the sheet in the mold. The inner surface defined by the rib contacting the edge of the graphics sheet helps position the graphics sheet in the mold. To further aid in proper placement of the graphics sheet, positioning pins may be provided in the mold; corresponding positioning holes are preferably formed in the graphics sheet. By providing two or more pins/holes in the mold/sheet, slippage or rotation of the graphics sheet before or during the molding operation can be effectively prevented. Suitable positioning structure, such as the pins and the rib in the mold or the holes in the graphics sheet, is described in more detail in parent application Ser. No. 08/190,914, the disclosure of which is incorporated by reference herein.

Next, an electrical charge is put on the graphics sheet, causing the sheet to adhere to the surface of the mold. This could be done before or after the sheet is placed in the mold. This step is important because the graphics sheet should not move during molding. It is also important that air pockets be prevented from forming between the mold and the graphics sheet; the molten plastic material must not ooze in front of the graphics sheet during the molding process, since this would produce an unattractive and sloppy result.

A quantity of molten plastic is then introduced into the mold via a plasticizer, injection nozzle or the like. Since the molten plastic is very hot, it bonds with the back surface of the graphics sheet into the front surface of the plastic. When the plastic cools, the graphics sheet is integrally formed on the front of the component.

The resulting component is more durable and more aesthetically pleasing than if conventional graphics, like decals, were applied. A decal may peel off or be nicked and torn, whereas the graphics sheet is smooth and flush with the front surface of the component. Also, the conventional materials from which the graphics sheet may be formed are resistant to degradation, making such materials desirable for a support system intended for outdoor use.

The graphics sheet also may be treated to ensure that it will accept printing inks. In particular, during the production of the graphics sheet, prior to printing on the sheet, the side of the graphics sheet to be printed on may be subjected to a corona treatment which imparts a positive charge to the sheet and opens up a plurality of small pores on the sheet. The sheet is then subjected to a printing process wherein printing ink is trapped within the small pores to provide the desired graphics appearance for the sheet. Finally, the printed side of the sheet may be provided with a U.V. coating in a silk screen process to form a laminate-like outer surface which is resistant to the deleterious effects of the weather and sun rays.

To avoid problems such as bowing or warping of the component as it cools during the molding operation, the graphics sheet should be formed of a material having the same or similar shrink rate when exposed to a molding operation as the shrink rate of the component material. In addition, forming the graphics sheet and the molded component of chemically compatible materials facilitates the bonding that occurs between these elements during the molding operation.

The graphics sheet may be formed of a material compatible with the materials of the components. Although any compatible material that readily receives ink is acceptable, it is preferable to use a graphics sheet sold by PPG Industries of Cleveland, Ohio, under the TESLIN name.

What is claimed is:

1. A method of packing a basketball goal support system in a box, the support system including a base, a ballast tank, and a pole support arm, said method comprising the steps of:

nesting the pole support arm in a recess in the base;

placing one of the base and the ballast tank in the box; and nesting the base and the ballast tank together, thereby minimizing the volume the system occupies.

2. The packing method of claim 1, further comprising the step of nesting a further support arm for a basketball pole in a recess in the base.

3. The packing method of claim 2, further comprising the step of placing a basketball backboard in the box in a position over the base.

4. The packing method of claim 1, further comprising the step of placing a basketball backboard in the box prior to the ballast tank.

5. The packing method of claim 1 further comprising nesting at least a portion of a basketball goal in another recessed portion of the tank.

* * * * *